United States Patent
Li et al.

(10) Patent No.: US 10,356,819 B2
(45) Date of Patent: Jul. 16, 2019

(54) SPATIAL-REUSE ENHANCEMENT IN RTS AND CTS

(71) Applicant: Apple Inc., Cupertino, CA (US)

(72) Inventors: Guoqing Li, Cupertino, CA (US); Yong Liu, Cupertino, CA (US); Joonsuk Kim, Saratoga, CA (US); Christiaan A. Hartman, Cupertino, CA (US); Chiu Ngok E. Wong, San Jose, CA (US); Syed Aon Mujtaba, Santa Clara, CA (US); Matt Semersky, Cupertino, CA (US); Su Khiong Yong, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 98 days.

(21) Appl. No.: 15/230,090

(22) Filed: Aug. 5, 2016

(65) Prior Publication Data
US 2017/0041798 A1 Feb. 9, 2017

Related U.S. Application Data

(60) Provisional application No. 62/201,173, filed on Aug. 5, 2015.

(51) Int. Cl.
*H04W 74/08* (2009.01)

(52) U.S. Cl.
CPC ................ *H04W 74/0816* (2013.01)

(58) Field of Classification Search
CPC .................................. H04W 74/0816
See application file for complete search history.

(56) References Cited

U.S. PATENT DOCUMENTS

| | | | | |
|---|---|---|---|---|
| 7,885,287 B2* | 2/2011 | Bachrach | .......... | H04W 74/0816 370/447 |
| 9,379,837 B2* | 6/2016 | Jindal | .................. | H04J 11/0026 |
| 9,661,647 B2* | 5/2017 | Liu | ...................... | H04W 72/121 |
| 9,749,964 B2* | 8/2017 | Huang | ................ | H04W 52/18 |
| 9,769,746 B2* | 9/2017 | Kwon | ............... | H04W 52/0206 |
| 9,986,586 B2* | 5/2018 | Lee | ..................... | H04W 74/004 |
| 2016/0353275 A1* | 12/2016 | Liu | ........................ | H04W 8/26 |
| 2017/0311352 A1* | 10/2017 | Lv | ..................... | H04W 74/0816 |

* cited by examiner

*Primary Examiner* — Asad M Nawaz
*Assistant Examiner* — Thomas R Caims
(74) *Attorney, Agent, or Firm* — Sterne, Kessler, Goldstein & Fox P.L.L.C.

(57) ABSTRACT

Disclosed herein are system, method, and computer program product embodiments for enabling a spatial reuse opportunity at a high efficiency (HE) station and a network allocation vector (NAV) reset capability at a legacy station using a Request to Send and/or Clear to Send (RTS and/or CTS) frame. For example, the method can include receiving a RTS frame with a redefined field that specifies spatial reuse information. The NAV can be set based on the RTS frame. The method can determine whether a second frame was received within a threshold time after a Short Interframe Space (SIFS). Finally, the method can reset the NAV based on whether the second frame was received within the threshold time.

16 Claims, 8 Drawing Sheets

SPATIAL-REUSE ENHANCEMENT IN RTS AND CTS

BACKGROUND

Technical Field

The disclosed embodiments relate to the field of wireless communications, including spatial reuse in wireless communications.

Background

A wireless communication protocol may support spatial reuse. For example, the Institute of Electrical and Electronics Engineers (IEEE) 802.11ax standard (current proposals and/or future versions) supports spatial reuse. A station may implement spatial reuse by determining whether a received frame is from its own basic service set (BSS) or an overlapping basic service set (OBSS). Specifically, the station may transmit according to different spatial reuse rules (e.g., a clear channel assessment (CCA) threshold) depending on whether the received frame is from the station's own BSS or from an OBSS. For example, the station may transmit more aggressively (e.g., use a higher CCA threshold value) for an inter-BSS frame, and transmit more conservatively (e.g., use a lower CCA threshold value) for an intra-BSS frame.

In addition, the station may use Request to Send and/or Clear to Send (RTS and/or CTS) frames to reserve the wireless medium and protect upcoming transmissions from interference from neighboring stations. For example, the station may transmit a RTS frame on the primary link to reserve the wireless medium and prevent the neighboring stations from transmitting on the primary link. But protecting upcoming transmissions using RTS and/or CTS frames, and effectively enabling a spatial reuse opportunity at a neighboring station, are conflicting goals.

SUMMARY

According to some embodiments, a Request to Send and/or Clear to Send (RTS and/or CTS) frame can be used to reserve a wireless medium for a wireless communications protocol. In some embodiments, the wireless communications protocol may be for the Institute of Electrical and Electronics Engineers (IEEE) 802.11ax standard (current proposals and/or future versions) or various other wireless communication protocols.

In some embodiments, a legacy station receives a RTS frame for a wireless communications protocol from an access point (AP). The RTS frame redefines a field to specify spatial reuse information (e.g., basic service set (BSS) identifier information, spatial reuse rules, etc.). This redefined field enables a spatial reuse opportunity at a high efficiency (HE) station. The legacy station sets its network allocation vector (NAV) based on the RTS frame (e.g., based on a duration field in the RTS frame). The legacy station then determines whether a second frame was received within a threshold time after a Short Interframe Space (SIFS). Thereafter, the legacy station resets its NAV based on whether the second frame was received within the threshold time.

In some embodiments, a HE station receives a standard RTS frame for a wireless communications protocol from an AP. The RTS frame redefines a field to specify spatial reuse information (e.g., basic service set (BSS) identifier information, spatial reuse rules, etc.). This redefined field enables a spatial reuse opportunity at the HE station. The HE station determines whether the RTS frame is from a BSS associated with the HE station. This determination may be based on BSS identifier information specified in the redefined field. The legacy station then sets its NAV based on this determination and the spatial reuse information in the redefined field. Thereafter, the HE station transmits subsequent frames according to this NAV setting.

In some embodiments, a station receives a new type of multiuser RTS (MU-RTS) frame for a wireless communications protocol from an AP. The MU-RTS frame includes a field that specifies spatial reuse information (e.g., BSS identifier information, spatial reuse rules, etc.), which enables a spatial reuse opportunity at a HE station. The station generates a standard CTS frame in response to the MU-RTS frame. The CTS frame redefines a field to include the spatial reuse information specified in the MU-RTS frame. The station then transmits the CTS frame to the AP in response to the MU-RTS frame. The CTS frame enables a NAV reset capability at a legacy station and a spatial reuse opportunity at a HE station.

Other features of the present disclosure will be apparent from the accompanying drawings and from the detailed description.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
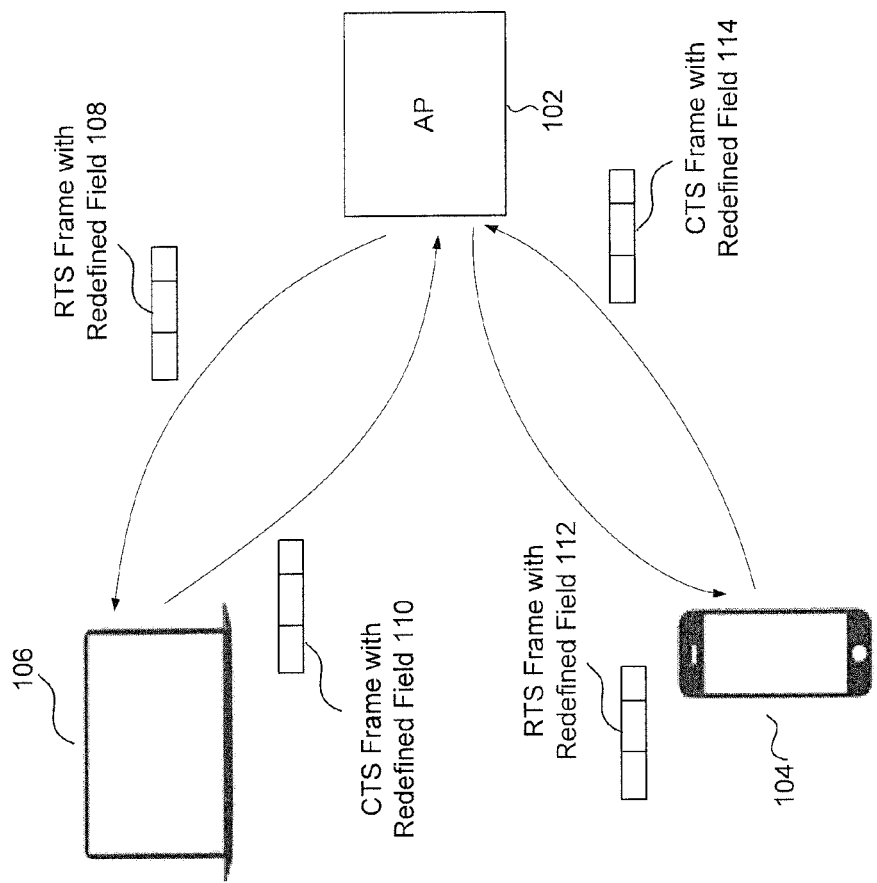
FIG. 1 illustrates an example system implementing a spatial reuse enhancement, according to some embodiments.

Provided herein are system, apparatus, device, method and/or computer program product embodiments, and/or combinations and sub-combinations thereof, for enabling spatial reuse opportunities at high efficiency (HE) stations and network allocation vector (NAV) reset capabilities at legacy stations that do no implement spatial reuse. Some embodiments operate by receiving a Request to Send (RTS) frame from an access point (AP) for a wireless communications protocol. Some embodiments set a NAV at a legacy station based on the RTS frame. Some embodiments then determine if a subsequent frame was received within a threshold time after a Short Interframe Space (SIFS) at the legacy station. Some embodiments reset the NAV at the legacy station based on whether the subsequent frame was received within the threshold time after the SIFS. In addition, some embodiments determine at an HE station whether the RTS frame is from a basic service set (BSS) associated with the HE station. Some embodiments determine whether the RTS frame is from the BSS associated with the HE station based on spatial reuse information in the RTS frame. Some embodiments set a NAV at the HE station based on this determination and spatial reuse information in the RTS frame.

A wireless communication protocol may support spatial reuse. For example, the Institute of Electrical and Electronics Engineers (IEEE) 802.11ax standard (current proposals and/or future versions) supports spatial reuse. Spatial reuse refers to the scheduling of multiple (and mutually non-interfering) transmissions simultaneously when all the links are operating in the same channel. A station that implements spatial reuse may be referred to as a "HE station." A station that does not implement spatial reuse may be referred to as a "legacy station."

In some embodiments, a HE station may implement spatial reuse by determining whether a received frame is from its own BSS or an overlapping basic service set (OBSS). A BSS may be a single AP together with all associated stations. An OBSS may be a different AP together with a set of associated stations that overlaps in coverage with the BSS.

In some embodiments, the HE station may determine whether the received frame is from its own BSS or an OBSS based on BSS identifier information included in the frame. In some embodiments, the BSS identifier information may be a BSS color (e.g., a hash of a media access control (MAC) address of the AP associated with the frame) or a MAC address of the AP associated with the frame.

In some embodiments, the HE station may apply different spatial reuse rules based on whether the received frame is from its own BSS or an OBSS. For example, the HE station may transmit aggressively (e.g., use a higher clear channel assessment (CCA) threshold value) when the received frame is from the OBSS (e.g., an inter-BSS frame), and transmit conservatively (e.g., use a lower CCA threshold value) when the received frame is from the station's own BSS (e.g., an intra-BSS frame). This approach avoids unnecessary channel access contention when traffic is from an OBSS.

In addition, the HE station needs to protect upcoming transmissions from interference from other stations (e.g., both HE stations and legacy stations). In some embodiments, stations may use RTS and/or Clear to Send (CTS) frames to mediate access to the shared wireless medium. For example, the HE station may transmit a RTS frame to a neighboring station via an AP to reserve the wireless medium and to protect upcoming transmissions from interference from a neighboring station. In response, the neighboring station may reply with a CTS frame to confirm the reservation. After receiving the CTS frame, the HE station may transmit its data.

More specifically, in some embodiments, the HE station may transmit the RTS frame to the neighboring station to set a network allocation vector (NAV) at the neighboring station. This enables the HE station to protect upcoming transmissions from possible interference from the neighboring station. The NAV allows the HE station to indicate the amount of time required for transmission of required frames immediately following the current frame. The value of the NAV may indicate how long the neighboring station must defer from accessing the wireless medium. In some embodiments, the neighboring station may set the NAV (e.g., a number of microseconds) based on a duration field of the RTS frame.

Standard RTS and/or CTS frames, however, may be unable to simultaneously protect upcoming transmissions from interference and enable spatial reuse opportunities at neighboring HE stations. This is because a neighboring station may want to apply different spatial reuse rules depending on whether a received frame is from the neighboring station's own BSS or from an OBSS. For example, the neighboring station may use a first CCA threshold to determine whether to set the NAV when the received RTS/CTS frame is from the neighboring station's own BSS, and use a second CCA threshold to decide whether to set the NAV when the received RTS and/or CTS frame is from an OBSS. Standard RTS and/or CTS frames, however, do not include different spatial reuse rules depending on whether a received frame is from the neighboring station's own BSS or from an OBSS.

One approach to managing this variability is to define a control frame called "enhanced RTS (eRTS)" and a control frame called "enhanced CTS (eCTS)" that include BSS identifier information. These control frames enable a station to both protect the wireless medium from neighboring stations and to enable spatial reuse opportunities at neighboring stations that implement spatial reuse (e.g., HE stations). For example, a station receiving eRTS and eCTS frames can set its NAV at a higher CCA threshold (e.g., it can transmit aggressively) than when receiving a standard, non-enhanced RTS and/or CTS frame.

However, standard RTS and/or CTS frames are well understood by legacy stations that do not implement spatial reuse. In particular, legacy stations may be able to apply certain medium utilization techniques based on the frame format of standard RTS and/or CTS frames. For example, standard RTS and/or CTS frames may enable a NAV reset capability at a legacy station. This NAV reset capability enables the legacy station to more effectively utilize the medium. For example, when the legacy station receives the RTS and/or CTS frames, it may set its NAV accordingly. But if the legacy station does not detect another frame within a threshold time period (e.g., after a short interframe space (SIFS)), the legacy station will reset its NAV. This resetting process enables the legacy station to utilize the medium for the remainder of time reserved by the NAV.

In some embodiments, several mechanisms are used to indicate BSS identifier information and one or more spatial reuse rules in standard RTS and/or CTS frames. These mechanisms indicate spatial reuse rules for existing RTS and/or CTS frames from an OBSS. These mechanisms simultaneously allow an HE station to protect upcoming transmissions from interference and enable a NAV reset capability at legacy stations. Thus, these mechanisms allow HE stations to effectively co-exist with legacy stations.

FIG. 1 illustrates an example system 100, according to some embodiments of the disclosure. System 100 includes an access point (AP) 102, an electronic device (e.g., a smartphone) 104, and an electronic device (e.g., a laptop) 106. Electronic devices 104 and 106 may be considered stations (STAs) in a network. Together with AP 102, electronic devices 104 and 102 form a BSS. It is to be appreciated that system 100 may include other electronic devices in addition to or in place of the electronic devices illustrated in FIG. 1 without departing from the scope and spirit of this disclosure.

AP 102 may transmit a RTS Frame with a Redefined Field 108 to electronic device 106. In response, electronic device 106 may transmit a CTS Frame with Redefined field 110 to AP 102. Similarly, AP 102 may transmit a RTS Frame with Redefined Field 112 to electronic device 104. In response, electronic device 104 may transmit a CTS Frame with Redefined field 114 to AP 102. System 100 may perform these transmissions using a wireless local network connection (such as, but not limited to, IEEE 802.11 standard, which is sometimes referred to as "Wi-Fi") or another wireless connection. For illustration purposes, examples will be provided in the context of an IEEE 802.11ax network.

In some embodiments, RTS Frame with Redefined Field 108 and RTS Frame with Redefined Field 112 may include one or more fields in a RTS frame that have been redefined to enable spatial reuse opportunities at HE stations while retaining NAV reset capabilities at legacy stations. Similarly, CTS Frame with Redefined Field 110 and CTS Frame with Redefined Field 112 may include one or more fields in a CTS frame that have been redefined to enable spatial reuse opportunities at HE stations while retaining NAV reset capabilities at legacy stations. These redefined fields of RTS Frame with Redefined Field 108, CTS Frame with Redefined Field 110, RTS Frame with Redefined Field 112, and CTS Frame with Redefined Field 114 are discussed further below with respect to FIGS. 2 and 3.

Figure 2:
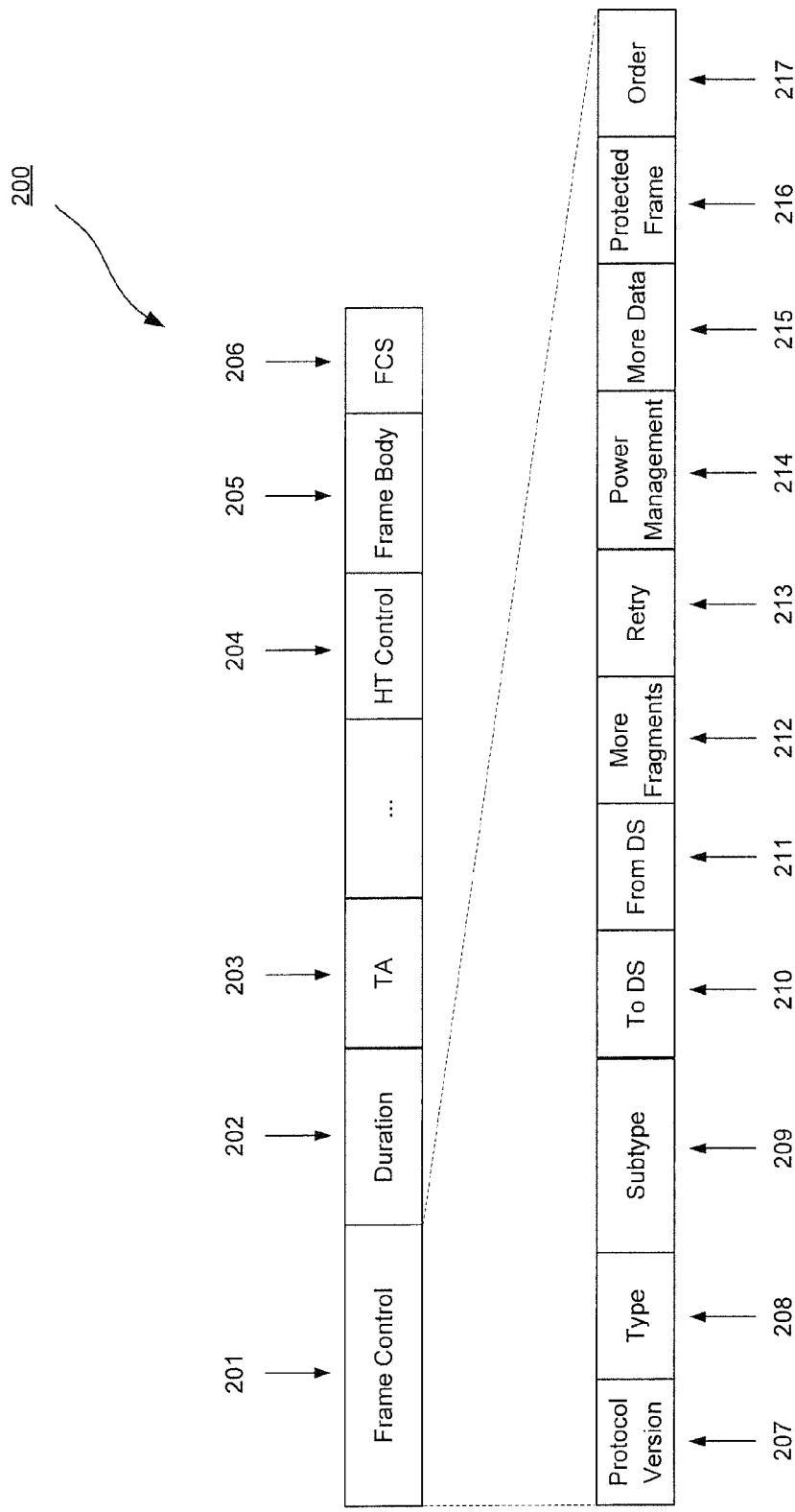
FIG. 2 is an illustration of an example standard RTS frame containing spatial reuse information in a frame control field for a wireless local area network (WLAN), according to some embodiments.

FIG. 2 is a block diagram of an example RTS frame 200 that applies spatial reuse rules through a frame control field 201, according to some embodiments. As would be appreciated by a person of ordinary skill in the art, a CTS frame may similarly apply spatial reuse rules through frame control 201. In some embodiments, RTS frame 200 may be transmitted in accordance with a standard, such as the IEEE 802.11ax standard (current proposals and/or future versions), or various other wireless communication protocols. In some embodiments, a station may transmit RTS frame 200 to a neighboring station to protect upcoming transmissions from possible interference. The station may transmit RTS frame 200 to the neighboring station to set the NAV at the neighboring station.

In some embodiments, RTS frame 200 may correspond to a RTS frame format for the IEEE 802.11ax standard (current proposals and/or future versions) or various other wireless communication protocols. RTS frame 200 may include at least the following fields: frame control 201, duration 202, transmitter address (TA) 203, high throughput (HT) control 204, frame body 205, and frame check sequence (FCS) 206.

In some embodiments, duration 202 may indicate the number of microseconds to assign a NAV at a neighboring station. TA 203, HT control 204, frame body 205 may correspond to standard TA, HT control, and frame body fields in, e.g., the IEEE 802.11ax standard (current proposals and/or future versions) or various other wireless communication protocols. FCS 206 may be an error detecting code implemented to detect data errors in RTS frame 200, as would be appreciated by a person of ordinary skill in the art.

In some embodiments, frame control 201 may include at least the following sub-fields: protocol version 207, type 208, subtype 209, to distribution system (DS) 210, from DS 211, more fragments 212, retry field 213, power management field 214, more data 215, protected frame 216, and order 217. Protocol version 207, type 208, subtype 209, and to DS 210 may respectively correspond to standard protocol version, type, subtype, and to DS sub-fields in, e.g., the IEEE 802.11ax standard (current proposals and/or future versions), or various other wireless communication protocols.

In some embodiments, from DS 211, more fragments 212, retry field 213, power management 214, more data 215, protected frame 216, and order 217 may be unused in the standard RTS and/or CTS frame format, e.g., for the IEEE 802.11ax standard (current proposals and/or future versions) or various other wireless communication protocols. Thus, in some embodiments, one or more bits in these fields may be redefined to include one or more spatial reuse rules to be used with RTS frame 200. In some embodiments, power management field 214 may be selected for redefining because from DS 211, more fragments 212, retry 213, more data 215, protected frame 216, and order 217 may be set to '0' when used with RTS frame 200. However, in various embodiments, any field, sub-field, or combination thereof may be redefined. As would be appreciated by a person of ordinary skill in the art, these sub-fields may be similarly redefined for a CTS frame.

In some embodiments, one or more bits of these sub-fields may be used to indicate different CCA thresholds to be used with RTS frame 200. For example, if power management 214 is set to '0', the neighboring station may use a CCA threshold of, e.g., −82 decibel-milliwatts (dBm) to decide to set the NAV. On the other hand, if power management 214 is set to '1', the neighboring station may use a CCA threshold of, e.g., −72 dBm to decide to set the NAV. As would be appreciated by a person of ordinary skill in the art, multiple bits may be used to indicate multiple CCA threshold levels as well as other spatial reuse parameters (e.g., transmit power). Also, any threshold value or values may be selected for use.

In some embodiments, BSS identifier information may be combined with the one or more bits in these sub-fields to control how OBSS stations behave in terms of spatial reuse. For example, if power management 214 is set to '0', the neighboring station may use a CCA threshold of, e.g., −82 dBm when RTS frame 200 is received from an OBSS. Similarly, if the power management 214 is set to '1', the neighboring station may use a CCA threshold of, e.g., −72 dBm when RTS frame 200 is received from the neighboring station's own BSS. In other embodiments, any threshold value or values may be selected for use. In some embodiments, the BSS identifier information may be specified in TA 203 of RTS frame 200 as discussed below.

Figure 3:
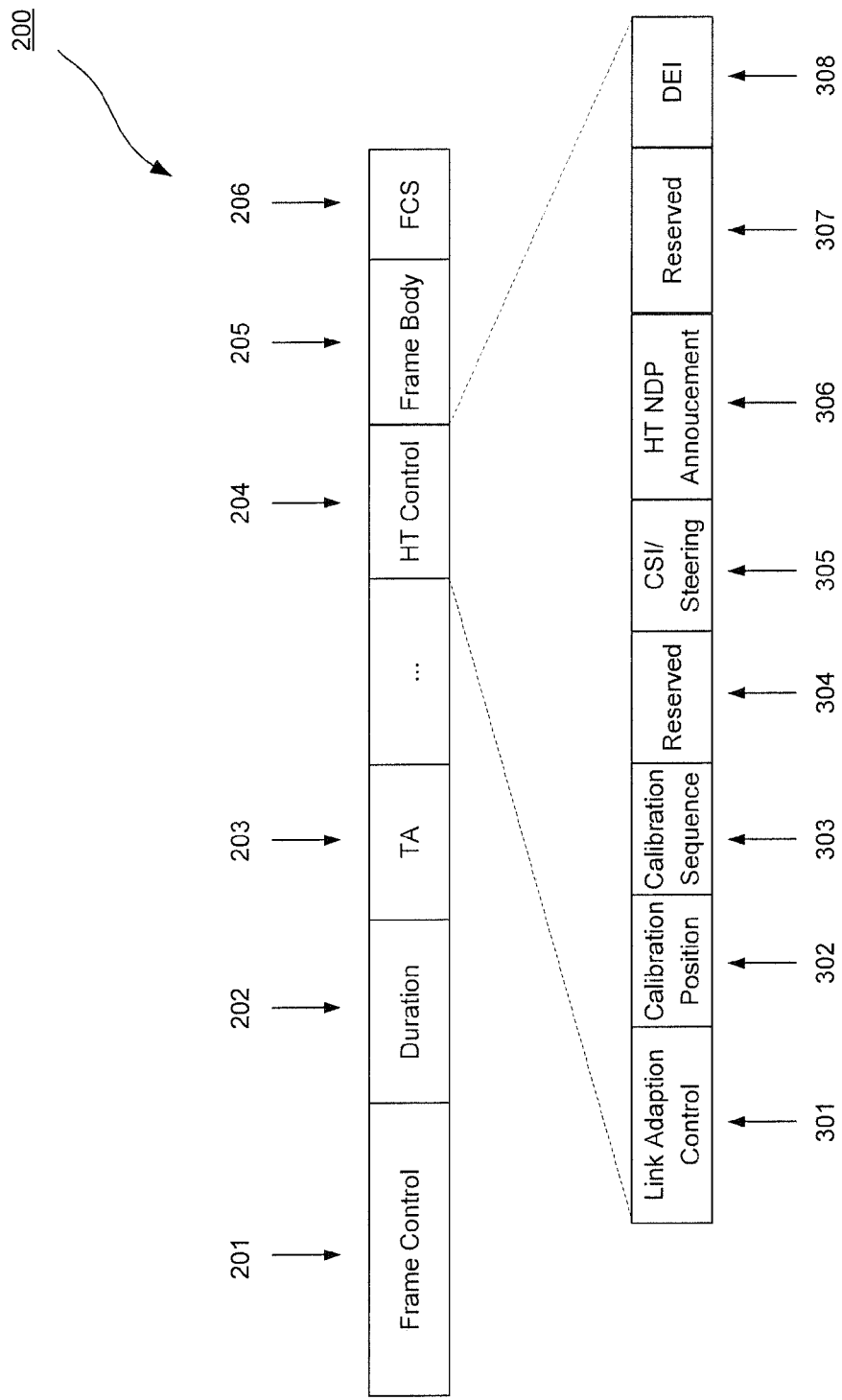
FIG. 3 is an illustration of an example standard RTS frame containing spatial reuse information in a HT control field WLAN, according to some embodiments.

FIG. 3 is a block diagram of RTS 200 that applies one or more spatial reuse rules through HT control 204, according to some embodiments. As would be appreciated by a person of ordinary skill in the art, the HT control field may be similarly redefined for a standard CTS frame.

In some embodiments, HT control 204 may include at least the following sub-fields: link adaptation control 301, calibration position 302, calibration sequence 303, reserved 304, channel state information (CSI)/steering 305, high throughput (HT) null data packet (NDP) announcement 306, reserved 307, and drop eligibility indicator (DEI) 308. These sub-fields may respectively correspond to standard link adaptation control, calibration position, calibration sequence, first reserved, CSI/steering, HT NDP announcement, second reserved, and DEI sub-fields in, e.g., the IEEE 802.11ax standard (current proposals and/or future versions) or various other wireless communication protocols.

In some embodiments, reserved 304 may be unused in the standard RTS and/or CTS frame format for, e.g., the IEEE 802.11ax standard (current proposals and/or future versions) or various other wireless communication protocols. In some embodiments, one or more bits in reserved 304 may be redefined (or repurposed) to include one or more spatial reuse rules to be used with RTS frame 200. As would be appreciated by a person of ordinary skill in the art, reserved 304 may be similarly redefined for a CTS frame.

In some embodiments, one or more bits of reserved 304 may be used to indicate different CCA thresholds to be used with RTS frame 200. For example, if reserved 304 is set to '0', a neighboring station may use a CCA threshold of, e.g., −82 dBm to decide to set the NAV. On the other hand, if reserved 304 is set to '1', the neighboring station may use a CCA threshold of, e.g., −72 dBm to decide to set the NAV. As would be appreciated by a person of ordinary skill in the art, multiple bits may be used to indicate multiple CCA threshold levels, as well as other spatial reuse parameters (e.g., transmit power). Also, any threshold value or values may be selected for use.

In some embodiments, BSS identifier information may be combined with the one or more bits in reserved 304 to control how OBSS stations behave in terms of spatial reuse. For example, if reserved 304 is set to '0', the neighboring station may use a CCA threshold of, e.g., −82 dBm when RTS frame 200 is from an OBSS. Similarly, if reserved 304 is set to '1', the neighboring station may use a CCA threshold of, e.g., −72 dBm when RTS 200 is from the neighboring station's own BSS. In some embodiments, the BSS identifier information may be specified in TA 203 of RTS frame 200 as discussed below. Also, any threshold value or values may be selected for use.

In some embodiments, TA 203 of RTS frame 200 may redefined to specify spatial reuse information (e.g., any/all of BSS identifier information, one or more spatial reuse rules, a station AID, etc.) for stations that receive RTS frame 200. TA 203 can be redefined to include this spatial reuse information instead of a 48-bit MAC address of the station that transmitted RTS frame 200, according to some embodiments.

In some embodiments, TA 203 may be a 48-bit field in which the most significant bit (MSB) is not redefined to enable dynamic bandwidth signaling, but the remaining 47-bits are redefined. The remaining 47-bits may include a special bit pattern that identifies TA 203 as a special type of TA field to HE stations. The remaining 47-bits may further include or indicate one or more spatial reuse rules for stations that receive RTS frame 200. In some embodiments, the one or more spatial reuse rules may be used to indicate different CCA thresholds to be used with RTS frame 200. For example, when one or more bits of a spatial reuse rule indication is set to a bit value of '0', a neighboring station may use a CCA threshold of, e.g., −82 dBm to decide to set the NAV. On the other hand, when the spatial reuse rule indication is set to a bit value of '1', the neighboring station may use a CCA threshold of, e.g., −72 dBm to decide to set the NAV. As would be appreciated by a person of ordinary skill in the art, multiple bits may be used for the spatial reuse rule indication to indicate multiple CCA threshold levels, as well as other spatial reuse parameters (e.g., transmit power). Also, any threshold value or values may be selected for use.

In some embodiments, the remaining 47-bits of TA 203 may further include any/all of BSS identifier information, a station AID, and/or any other indication information sought to be specified to the station(s) receiving RTS frame 200. The station AID may identify the station that transmitted RTS frame 200. The BSS identifier information may identify whether RTS frame 200 is from the same BSS as the receiving station or an OBSS. In some embodiments, the BSS identifier information may be specified as a BSS color (e.g., a hash of a MAC address of the AP associated with the transmitting station).

In some embodiments, the one or more spatial reuse rules and BSS identifier information in TA 203 may be combined together to control how OBSS stations behave in terms of spatial reuse. In some embodiments, the BSS identifier information in TA 203 may be combined with the one or more spatial reuse rules specified in, e.g., frame control 201 or in HT control 204 to control how OBSS stations behave in terms of spatial reuse. Thus, by redefining TA 203 to specify BSS identifier information, together with redefining frame control 201, HT control 204, or TA 203 to include one or more spatial reuse rules, a station may protect upcoming transmissions, enable spatial reuse opportunities at HE stations, and enable NAV cancellation at legacy stations.

In some embodiments, a station may transmit a CTS frame containing a redefined receiver address (RA) field, e.g., in response to receiving RTS frame 200 with a redefined TA 203. For example, the station may copy a portion of the redefined TA 203 into the RA field of the CTS frame.

In some embodiments, the RA field may be a 48-bit field in which the MSB is not redefined to enable dynamic bandwidth signaling, but the remaining 47-bits are redefined. The remaining 47-bits may include a special bit pattern that identifies the RA field as a special type of RA field to HE stations and a station AID that identifies the station transmitting the CTS frame. The remaining 47-bits may further include the one or more spatial reuse rules and BSS identifier information specified in the redefined TA 203. In this way, the CTS frame is able to carry BSS identifier information that is not present in a non-redefined CTS frame.

In addition to a non-redefined RTS frame, in some embodiments, an AP may send a multiuser (MU) RTS frame to solicit multiple CTS frames from one or more stations at the same time. Specifically, a MU-RTS frame may be a downlink (DL) request that solicits multiple CTS frames simultaneously in an uplink (UL) multiuser transmission. In some embodiments, a MU-RTS frame may be a trigger frame for, e.g, the IEEE 802.11ax standard (current proposals and/or future versions), or various other wireless communication protocols.

Figure 4:
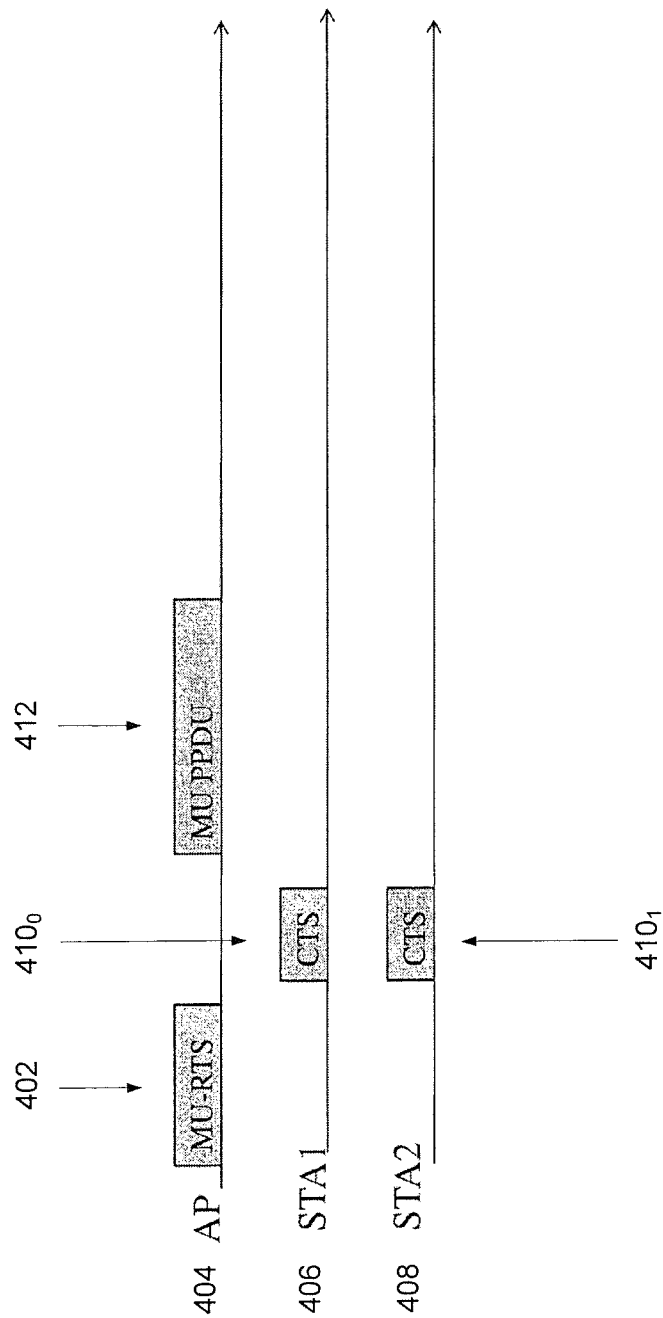
FIG. 4 is an illustration of an example MU-RTS frame that solicits simultaneous CTS frames for a WLAN, according to some embodiments.

FIG. 4 is a block diagram of an example MU-RTS frame 402 for multicast RTS transmission to two stations, according to some embodiments. In some embodiments, MU-RTS 402 may be transmitted in accordance with a standard, such as the IEEE 802.11ax standard (current proposals and/or future versions) or various other wireless communication protocols.

For example, in FIG. 4, AP 404 may transmit MU-RTS 402 to stations 406 and 408 to reserve the wireless medium. In response, stations 406 and 408 may each acknowledge receipt of the frame by substantially simultaneously respectively transmitting CTS $410_0$ and CTS $410_1$ to AP 404, such that the respective CTS frames are at least partially overlapping. AP 404 may then transmit a multiuser physical layer protocol data unit (MU-PDDU) containing data of interest to stations 406 and 408. In some embodiments, using MU-RTS 402 may save network resources. Specifically, MU-RTS 402 may eliminate the need to utilize multiple channel access times, multiple preamble times, and/or multiple SIFS.

Similar to the problems associated with using standard RTS and/or CTS frames, there can be problems with returning a standard CTS frame in response to a MU-RTS frame. For example, returning a standard CTS frame in response to a MU-RTS frame may prevent spatial reuse from OBSS stations. Specifically, because a standard CTS frame does not contain BSS identifier information, a station receiving the standard CTS frame may have to set its NAV, thereby limiting its spatial reuse capability. Consequently, even though multi-user transmissions (e.g., orthogonal frequency division multiple access (OFDMA) or multi-user multiple-input multiple-output (MU-MIMO)) are being used in a BSS to improve efficiency, the use of a MU-RTS frame with standard CTS frames can reduce the overall network throughput because of reduced spatial-reuse opportunity.

In some embodiments, to address the problems associated with the use of a MU-RTS frame and a standard CTS frame, a new type of MU-RTS frame may be defined. The new MU-RTS frame may include a TA field that specifies spatial reuse information (e.g., any/all of BSS identifier information, one or more spatial reuse rules, and/or transmitter station AID) and various other information as would be appreciated by a person of ordinary skill in the art. In some embodiments, the new MU-RTS frame may specify the spatial reuse information in a new field in the new MU-RTS frame, or in a PHY preamble portion of the MU-RTS frame (e.g., if the new MU-RTS frame is using a HE PPDU frame format).

In some embodiments, a CTS frame may be defined as a response frame to the new MU-RTS frame. However, the CTS response frame may carry spatial reuse information. The spatial reuse information may help a neighboring IEEE 802.11ax station decide its spatial reuse rules. For example, the spatial reuse information carried in the CTS frame may control an OBSS station's spatial reuse behavior.

In some embodiments, the CTS may be a new control frame (e.g., an eCTS frame). In some embodiments, the CTS frame may be a standard CTS frame that redefines, e.g., the RA field to include the BSS identifier information and one or more spatial reuse rules specified in the new MU-RTS frame.

In some embodiments, the RA field of the CTS frame may be a 48-bit field in which the most significant bit (MSB) is not redefined to enable dynamic bandwidth signaling, but the remaining 47-bits are redefined. The remaining 47-bits may include a special bit pattern (e.g., 01010101 . . . 01) that identifies the RA field as a special type of RA field to HE stations. In some embodiments, the special bit pattern in the RA field may allow an IEEE 802.11ax station to determine that this is a special CTS frame that contains spatial reuse information. In contrast, a special bit pattern may not be needed in the new MU-RTS frame because the new MU-RTS frame is a new control frame that is not recognized by legacy stations.

In some embodiments, the remaining 47-bits of the RA field may further include the one or more spatial reuse rules and BSS identifier information specified in the new MU-RTS frame. In some embodiments, this may involve copying a portion of the TA field in the new MU-RTS frame into the RA field of the CTS frame. In this way, the CTS frame is able to carry spatial reuse information that is not normally present in a standard CTS frame.

Figure 5:
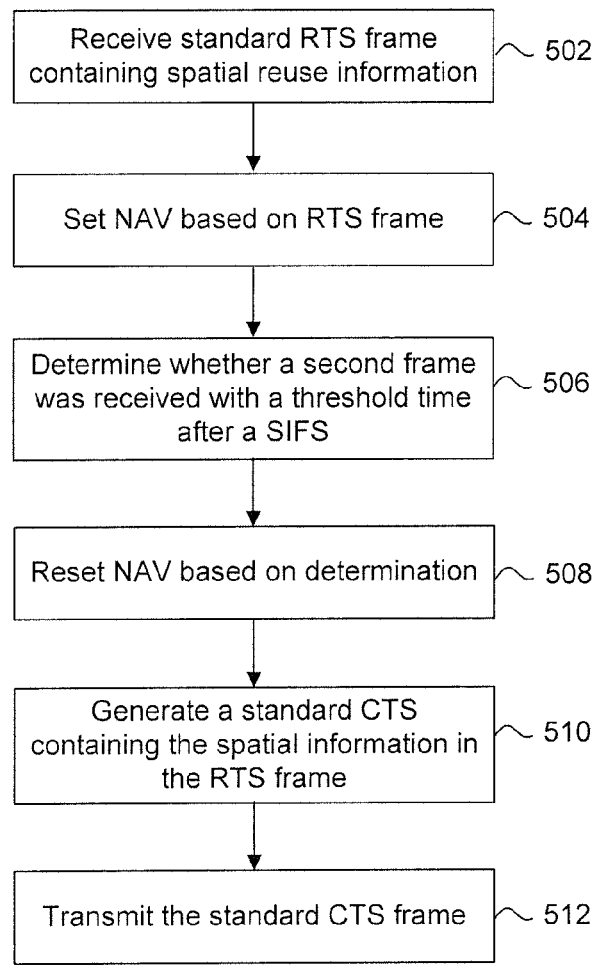
FIG. 5 is a flowchart illustrating an example of enabling a NAV reset capability at a legacy station that does not implement spatial reuse using a standard RTS containing spatial reuse information, according to some embodiments.

FIG. 5 is a flowchart of an example method 500 for enabling a NAV reset capability at a legacy station that does not implement spatial reuse, according to some embodiments. Method 500 can be performed by processing logic that can include hardware (e.g., circuitry, dedicated logic, programmable logic, microcode, etc.), software (e.g., instructions executing on a processing device), or a combination thereof.

In 502, the legacy station receives a standard RTS frame (for a wireless communication protocol) from an AP. The wireless communications protocol may correspond to a standard, such as the IEEE 802.11ax standard (current proposals and/or future versions) or various other wireless communication protocols. The RTS frame may include standard fields, e.g., as specified in the IEEE 802.11ax standard (current proposals and/or future versions) or various other wireless communication protocols. For example, the RTS frame may include at least the following fields: frame control, duration, TA, HT control, frame body, and frame FCS. These fields are described above with respect to FIGS. 2 and 3.

In some embodiments, one or more of the frame control, TA, and/or HT control fields may be redefined to include spatial reuse information (e.g., BSS identifier information, spatial reuse rules, etc.). In some embodiments, one or more bits of the sub-fields of the frame control field may be redefined to include one or more spatial reuse rules (e.g., different CCA thresholds to be used with the RTS frame). For example, the power management field of the frame control field may be redefined to include one or more spatial reuse rules.

In some embodiments, one or more bits of a reserved field of the HT control field may be redefined to include one or more spatial reuse rules (e.g., different CCA thresholds to be used with the RTS frame). In some embodiments, the TA field may be redefined to include spatial reuse information instead of the MAC address of the station transmitting the RTS frame onto the wireless medium. Specifically, the TA field may be a 48-bit field in which the most significant bit (MSB) is not redefined to enable dynamic bandwidth signaling, but some or all of the remaining 47-bits are redefined. The remaining 47-bits may include a special bit pattern that identifies the TA field as a special type of TA field to HE stations. The remaining 47-bits of the TA field may further include BSS identifier information (e.g., BSS color), a station AID, and/or any other indication information sought to be specified to the stations that receive the RTS frame.

As would be appreciated by a person of ordinary skill in the art, any/all of the frame control, HT control, and TA fields may be similarly redefined for a CTS frame. In addition, in some embodiments, the BSS identifier information in the TA field may be combined with spatial reuse information specified in the frame control field or the HT control field in order to enable a spatial reuse opportunity at a HE station.

In 504, the legacy station sets its NAV based on the RTS frame. In some embodiments, the legacy stations sets its NAV based on a number of microseconds specified in the duration field of RTS frame.

In 506, the legacy station determines whether a second frame was received at the legacy station within a threshold time after an amount of time required for the legacy station to process the second frame and to respond with a response frame (e.g., a SIFS).

In 508, the legacy station resets its NAV if the legacy station determines that no second frame was received within a threshold time after SIFS. Alternatively, the legacy station maintains its NAV if the legacy station determines that the second frame was received within a threshold time after SIFS.

In 510, the legacy station generates a CTS frame that contains a redefined RA field in response to receiving the RTS frame that contains spatial reuse information. For example, the legacy station may copy a portion of the spatial reuse information in a redefined TA field in the RTS frame into the RA field.

In 512, the legacy station may transmit the CTS frame to the AP.

Figure 6:
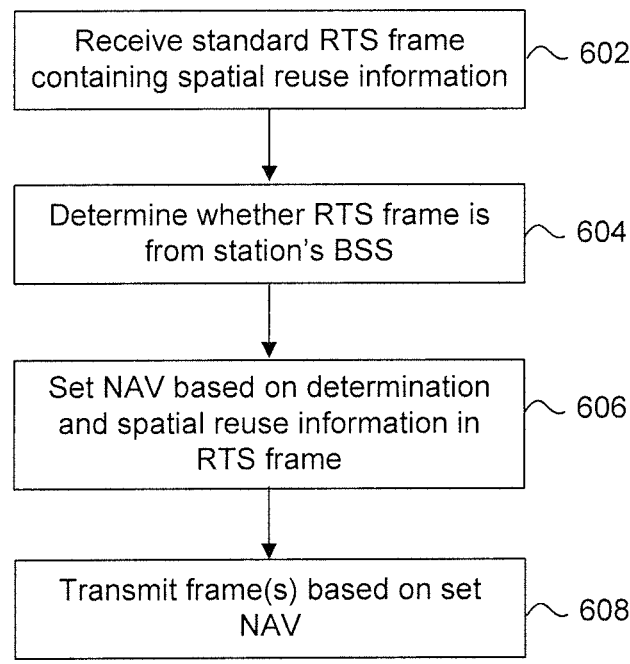
FIG. 6 is a flowchart illustrating an example of enabling a spatial reuse opportunity at a HE station that implements spatial reuse using a standard RTS frame, according to some embodiments.

FIG. 6 is a flowchart of an example method 600 for enabling a spatial reuse opportunity at a HE station that implements spatial reuse, according to some embodiments. Method 600 can be performed by processing logic that can include hardware (e.g., circuitry, dedicated logic, programmable logic, microcode, etc.), software (e.g., instructions executing on a processing device), or a combination thereof.

In 602, the HE station receives a standard RTS frame (for a wireless communication protocol) from an AP. The wireless communications protocol may correspond to a standard such as the IEEE 802.11ax standard (current proposals and/or future versions) or various other wireless communication protocols. The RTS frame may include standard fields, e.g., as specified in the IEEE 802.11ax standard (current proposals and/or future versions), or various other wireless communication protocols. For example, the RTS frame may include at least the following fields: frame control, duration, TA, HT control, frame body, and frame FCS. These fields are described above with respect to FIGS. 2 and 3.

In some embodiments, one or more of the frame control, TA, and HT control fields may be redefined to include spatial reuse information (e.g., BSS identifier information, spatial reuse rules, etc.). As would be appreciated by a person of ordinary skill in the art, the frame control, HT control, and TA fields may be similarly redefined for a CTS frame. In some embodiments, one or more bits of the sub-fields of the frame control field may be redefined to include one or more spatial reuse rules (e.g., different CCA thresholds to be used with the RTS frame). For example, the power management field of the frame control field may be redefined to include one or more spatial reuse rules.

In some embodiments, one or more bits of a reserved field of the HT control field may be redefined to include one or more spatial use rules (e.g., different CCA thresholds to be used with the RTS frame). In some embodiments, the TA field may be redefined to include spatial reuse information instead of the MAC address of the station transmitting the RTS frame onto the wireless medium. Specifically, the TA field may be a 48-bit field in which the most significant bit (MSB) is not redefined to enable dynamic bandwidth signaling, but the remaining 47-bits are redefined. The remaining 47-bits may include a special bit pattern that identifies the TA field as a special type of TA field to HE stations. The remaining 47-bits of the TA filed may further include BSS identifier information (e.g., BSS color), a station AID, and any other information sought to be specified to the stations that receive the RTS frame.

In 604, the HE station determines whether the RTS frame is from a BSS associated with the HE station. In some embodiments, the HE station may make this determination based on BSS identifier information in the redefined TA field in the RTS frame.

In 606, the HE station sets its NAV based on the determination of whether the RTS frame is from a BSS associated with the HE station and one or more spatial reuse rules specified in the RTS frame (e.g., one or more spatial reuse rules specified in the frame control field, HT control field, or TA control field). In other words, the BSS determination may be combined with spatial reuse rules specified in the RTS frame to enable a spatial reuse opportunity at the HE station. For example, the HE station may use a first spatial reuse rule (e.g., a first CCA threshold value) to decide to set the NAV when the RTS frame from is from the BBS associated with the HE station, and a second spatial reuse rule (e.g., a second CCA threshold value) to decide to set the NAV when the RTS frame from is from an OBSS.

In 608, the HE station may transmit subsequent frames to the AP based on its NAV setting.

Figure 7:
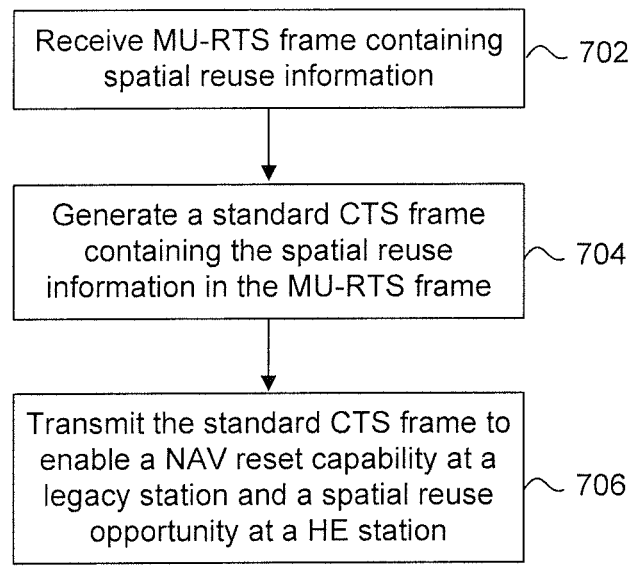
FIG. 7 is a flowchart illustrating an example of soliciting multiple CTS frames from one or more stations at the same time using a MU-RTS frame, according to some embodiments.

FIG. 7 is a flowchart of an example method 700 for soliciting multiple CTS frames from receiving stations at substantially the same time, according to some embodiments. Method 700 can be performed by processing logic that can include hardware (e.g., circuitry, dedicated logic, programmable logic, microcode, etc.), software (e.g., instructions executing on a processing device), or a combination thereof.

In 702, a station receives a new type of MU-RTS frame (for a wireless communication protocol) multicast from an AP. The wireless communications protocol may correspond to a standard, such as the IEEE 802.11ax standard (current proposals and/or future versions) or various other wireless communication protocols. As would be appreciated by a person of ordinary skill, the MU-RTS frame may be received at substantially the same time as when the new MU-RTS frame is received at another station.

In some embodiments, the new MU-RTS frame may include a TA field that may specify spatial reuse information (e.g., BSS identifier information, one or more spatial reuse rules, transmitter station AID, and various other information as would be appreciated by a person of ordinary skill in the art). In some embodiments, the new MU-RTS frame may specify the spatial reuse information in a new field in the new MU-RTS frame or in a PHY preamble portion of the MU-RTS frame.

In 704, the station generates a CTS frame in response to the new MU-RTS frame. In some embodiments, the CTS frame may carry spatial reuse information. The spatial reuse information carried in the CTS frame may help a neighboring IEEE 802.11ax station decide its spatial reuse rules. For example, the spatial-reuse information carried in the CTS frame may control an OBSS station's spatial reuse behavior.

In some embodiments, the CTS frame may be a new control frame (e.g., an eCTS frame) that carries the spatial reuse information. In some embodiments, the CTS frame may be a CTS frame that redefines the RA field to include the BSS identifier information and spatial-reuse rules specified in the new MU-RTS frame. Specifically, the most significant bit (MSB) of the RA field is not redefined in order to enable dynamic bandwidth signaling, but the remaining 47-bits are redefined. The remaining 47-bits may include a special bit pattern (e.g., 01010101 . . . 01) that identifies the RA field as a special type of RA field to HE stations.

In some embodiments, the remaining 47-bits of the RA field may further include the one or more spatial reuse rules and BSS identifier information specified in the new MU-RTS frame. In some embodiments, the station may copy a portion of the TA field in the new MU-RTS frame into the RA field of the CTS frame. In this way, the CTS frame is able to carry spatial reuse information that is not normally present in a non-redefined CTS frame.

In 706, the station may transmit the CTS frame to the AP. In some embodiments, the CTS frame may enable a NAV reset capability at a legacy station while enabling a spatial reuse opportunity at a HE station. This is because the CTS frame retains the standard CTS frame format and contains spatial reuse information. In some embodiments, the CTS frame (e.g., an eCTS frame) may enable a spatial reuse opportunity at the HE station that receives the CTS frame. This is because the eCTS frame contains spatial reuse information.

Figure 8:
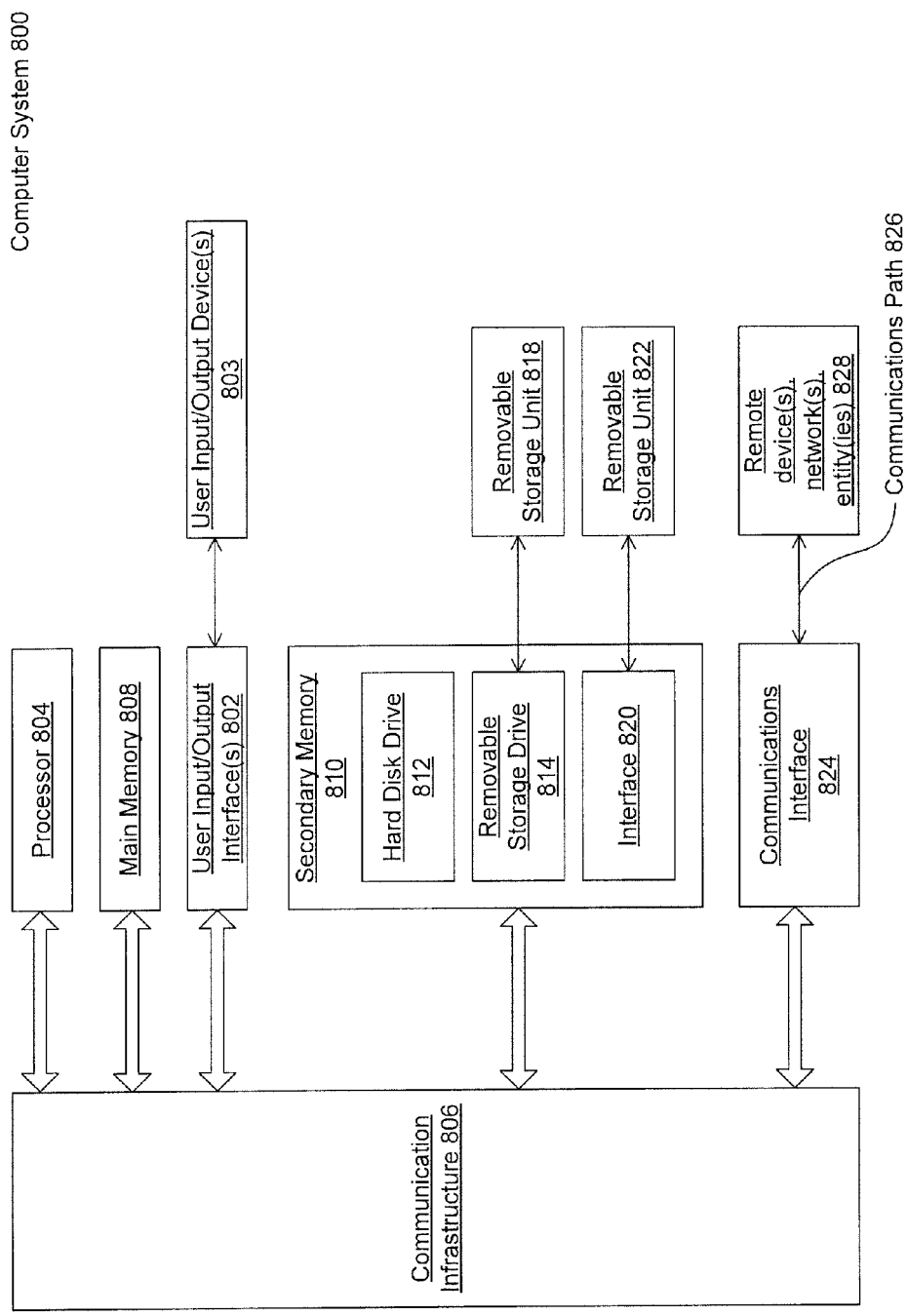
FIG. 8 is an example computer system for implementing various embodiments.

Various embodiments can be implemented, for example, using one or more computer systems, such as computer system 800 shown in FIG. 8. Computer system 800 can be used, for example, to implement method 500 of FIG. 5. For example, computer system 800 can set a NAV at a legacy station based on a standard RTS frame containing a field redefined to specify spatial reuse information. Computer system 800 can further reset the NAV at the legacy station based on the standard RTS frame, according to some embodiments. Computer system can also be used, for example, to implement system 100 of FIG. 1 and methods 600 and 700 of FIGS. 6 and 7, respectively. Computer system 800 can be any computer capable of performing the functions described herein.

Computer system 800 includes one or more processors (also called central processing units, or CPUs), such as a processor 804. Processor 804 is connected to a communication infrastructure or bus 806.

One or more processors 804 may each be a graphics processing unit (GPU). In embodiments, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to embodiments, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In embodiments, a tangible apparatus or article of manufacture including a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of the disclosure herein using data processing devices, computer systems and/or computer architectures other than that shown in FIG. 8. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A method for signaling spatial reuse using a control frame, comprising:
   receiving a request to send (RTS) frame from an access point (AP), wherein the RTS frame includes a transmitter address (TA) field that specifies a basic service set (BSS) identifier for a BSS and a spatial reuse rule;
   setting a network allocation vector (NAV) based at least in part on the RTS frame;
   determining a second frame was not received within a threshold duration after a Short Interframe Space (SIFS) following the RTS frame; and
   resetting the NAV based at least in part on the determination that the second frame was not received.

2. The method of claim 1, wherein the setting comprises setting the NAV based at least in part on a clear channel assessment (CCA) threshold associated with the spatial reuse rule.

3. The method of claim 1, further comprising:
   generating a clear to send (CTS) frame; and
   transmitting the CTS frame to the AP.

4. The method of claim 3, wherein the generating comprises redefining a receiver address (RA) field of the CTS frame to include the spatial reuse rule.

5. The method of claim 1, wherein the receiving comprises receiving the RTS frame from the AP at a station that does not implement spatial reuse.

6. The method of claim 5, wherein the BSS identifier and the spatial reuse rule enable a spatial reuse opportunity at a different station that implements spatial reuse.

7. The method of claim 1, wherein the RTS frame is standard compliant.

8. A system comprising:
   a memory; and
   at least one processor coupled to the memory and configured to:
      receive a multiuser request to send (MU-RTS) frame from an access point (AP), wherein the MU-RTS frame includes a basic service set (BSS) identifier and a spatial reuse rule;
      generate a clear to send (CTS) frame including a receiver address (RA) field that specifies the BSS identifier and the spatial reuse rule; and
      transmit the CTS frame to the AP, wherein the CTS frame enables at least one of a network allocation vector (NAV) reset capability or a spatial reuse opportunity.

9. The system of claim 8, wherein the MU-RTS frame comprises a trigger frame that enables transmission of the CTS frame.

10. The system of claim 8, wherein the MU-RTS frame comprises a control frame.

11. The system of claim 8, wherein the at least one processor is further configured to include a unique bit pattern value in the RA field to identify a RA field type.

12. A non-transitory computer-readable device having instructions stored thereon that, when executed by at least one computing device, cause the at least one computing device to perform operations comprising:
   receiving a request to send (RTS) frame from an access point (AP), wherein the RTS frame includes a transmitter address (TA) field that specifies a basic service set (BSS) identifier and a spatial reuse rule;
   determining the RTS frame is from a BSS associated with the at least one computing device based at least in part on the BSS identifier;
   setting a network allocation vector (NAV) based at least in part on the determination that the RTS frame is from the BSS associated with the at least one computing device; and
   transmitting a second frame to the AP based at least in part on the NAV.

13. The non-transitory computer-readable device of claim 12, wherein the determining comprises determining a TA field type based at least in part on a unique bit pattern in the TA field.

14. The non-transitory computer-readable device of claim 12, wherein the spatial reuse rule specifies a clear channel assessment (CCA) threshold.

15. The non-transitory computer-readable device of claim 12, wherein the determining comprises comparing the BSS identifier to the BSS associated with the at least one computing device.

16. The non-transitory computer-readable device of claim 12, wherein the setting comprises setting the NAV based at least in part on the BSS identifier and the spatial reuse rule.

* * * * *